(12) United States Patent
Chatterjee et al.

(10) Patent No.: US 10,176,103 B1
(45) Date of Patent: *Jan. 8, 2019

(54) SYSTEMS, DEVICES AND METHODS USING A SOLID STATE DEVICE AS A CACHING MEDIUM WITH A CACHE REPLACEMENT ALGORITHM

(71) Applicant: American Megatrends, Inc., Norcross, GA (US)

(72) Inventors: Paresh Chatterjee, Fremont, CA (US); Srikumar Subramanian, Suwanee, GA (US); Senthilkumar Ramasamy, Duluth, GA (US); Narayanaswami Ganapathy, Newark, CA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/145,883

(22) Filed: May 4, 2016

Related U.S. Application Data

(60) Provisional application No. 62/158,044, filed on May 7, 2015.

(51) Int. Cl.
*G06F 12/0866* (2016.01)

(52) U.S. Cl.
CPC .... *G06F 12/0866* (2013.01); *G06F 2212/222* (2013.01); *G06F 2212/224* (2013.01)

(58) Field of Classification Search
CPC .......... G06F 3/0659; G06F 2003/0697; G06F 3/0604; G06F 3/0611; G06F 3/0658; G06F 3/0688; G06F 3/061; G06F 12/0871; G06F 2212/222; G06F 3/0685; G06F 11/108; G06F 12/0804; G06F 12/0868; G06F 12/123; G06F 3/064
USPC .................................................. 711/103, 114
See application file for complete search history.

(56) References Cited

U.S. PATENT DOCUMENTS

| | | | |
|---|---|---|---|
| 4,989,131 | A | 1/1991 | Stone |
| 5,499,337 | A | 3/1996 | Gordon |
| 5,680,579 | A | 10/1997 | Young et al. |
| 5,732,240 | A | 3/1998 | Caccavale |

(Continued)

OTHER PUBLICATIONS

Co-pending U.S. Appl. No. 15/145,084, filed May 3, 2016.

(Continued)

*Primary Examiner* — Mardochee Chery
(74) *Attorney, Agent, or Firm* — Meunier Carlin & Curfman LLC

(57) ABSTRACT

An example method for performing cache replacement in a caching medium for a data storage system can include providing an SSD cache, providing an LRU data structure including buckets for managing the SSD cache, and providing cache headers for managing the cache lines. The method can include assigning two or more cache headers to a same bucket of the LRU data structure, and arranging the cache headers in a linked list based on access time. A cache header for an LRU cache line is a tail node of the linked list. The method can further include providing an LFU data structure including frequency buckets, assigning the tail node of the linked list of the same bucket of the LRU data structure to a frequency bucket based on access frequency, and selecting an LFU cache line for cache replacement using the LFU data structure.

20 Claims, 7 Drawing Sheets

(56) References Cited

U.S. PATENT DOCUMENTS

| | | |
|---|---|---|
| 5,799,324 A | 8/1998 | McNutt et al. |
| 5,802,561 A | 9/1998 | Fava et al. |
| 5,892,937 A | 4/1999 | Caccavale |
| 6,175,900 B1 | 1/2001 | Forin et al. |
| 6,490,578 B1 | 12/2002 | Burkhard |
| 6,523,102 B1 | 2/2003 | Dye et al. |
| 6,553,511 B1* | 4/2003 | DeKoning .......... G06F 11/1076 707/999.1 |
| 6,606,629 B1* | 8/2003 | DeKoning .......... G06F 11/1076 |
| 6,651,153 B1 | 11/2003 | Orfali |
| 7,177,850 B2 | 2/2007 | Argenton et al. |
| 7,257,684 B1 | 8/2007 | Sinha et al. |
| 8,219,724 B1 | 7/2012 | Caruso et al. |
| 8,572,736 B2 | 10/2013 | Lin |
| 8,631,472 B1 | 1/2014 | Martin et al. |
| 8,775,741 B1 | 7/2014 | de la Iglesia |
| 9,256,272 B2 | 2/2016 | Hasegawa et al. |
| 9,501,420 B2 | 11/2016 | Susarla et al. |
| 9,632,932 B1 | 4/2017 | Sutardja et al. |
| 9,798,754 B1 | 10/2017 | Shilane et al. |
| 2002/0091965 A1 | 7/2002 | Moshayedi |
| 2004/0148471 A1 | 7/2004 | Wallin et al. |
| 2004/0260883 A1 | 12/2004 | Wallin et al. |
| 2005/0278486 A1 | 12/2005 | Trika et al. |
| 2007/0006013 A1 | 1/2007 | Moshayedi et al. |
| 2007/0260811 A1 | 11/2007 | Merry et al. |
| 2009/0204853 A1 | 8/2009 | Diggs et al. |
| 2009/0210620 A1 | 8/2009 | Jibbe et al. |
| 2009/0228646 A1 | 9/2009 | Edwards et al. |
| 2010/0070703 A1* | 3/2010 | Sarkar .................. G06F 3/0613 711/114 |
| 2010/0082879 A1* | 4/2010 | McKean ............... G06F 3/0611 711/103 |
| 2010/0088459 A1 | 4/2010 | Arya et al. |
| 2010/0100664 A1 | 4/2010 | Shimozono |
| 2010/0122200 A1 | 5/2010 | Merry et al. |
| 2010/0235670 A1 | 9/2010 | Keller et al. |
| 2010/0250842 A1 | 9/2010 | Deshpande et al. |
| 2010/0299547 A1 | 11/2010 | Saika |
| 2011/0029686 A1 | 2/2011 | Sethi et al. |
| 2011/0087833 A1 | 4/2011 | Jones |
| 2011/0173378 A1 | 7/2011 | Filor et al. |
| 2011/0238922 A1 | 9/2011 | Hooker et al. |
| 2012/0072698 A1 | 3/2012 | Unesaki et al. |
| 2012/0185647 A1 | 7/2012 | Dawkins |
| 2012/0221774 A1 | 8/2012 | Atkisson et al. |
| 2013/0038961 A1 | 2/2013 | Song |
| 2013/0122856 A1 | 5/2013 | Kalmbach et al. |
| 2013/0145223 A1 | 6/2013 | Okada et al. |
| 2013/0185511 A1 | 7/2013 | Sassone et al. |
| 2013/0285835 A1 | 10/2013 | Kim et al. |
| 2013/0318603 A1 | 11/2013 | Merza |
| 2014/0050002 A1 | 2/2014 | Sun |
| 2014/0052942 A1 | 2/2014 | Satou |
| 2014/0089558 A1 | 3/2014 | Baderdinni |
| 2014/0095547 A1 | 4/2014 | Guo et al. |
| 2014/0129758 A1 | 5/2014 | Okada et al. |
| 2014/0143505 A1 | 5/2014 | Sim et al. |
| 2014/0201442 A1 | 7/2014 | Rajasekaran et al. |
| 2014/0325166 A1 | 10/2014 | Iyigun et al. |
| 2015/0026403 A1 | 1/2015 | Ish et al. |
| 2015/0095567 A1 | 4/2015 | Noda |
| 2015/0206558 A1 | 7/2015 | Ni et al. |
| 2015/0278127 A1 | 10/2015 | Takakura |
| 2015/0370715 A1 | 12/2015 | Samanta et al. |
| 2016/0004459 A1 | 1/2016 | Oohira |
| 2016/0011782 A1 | 1/2016 | Kurotsuchi et al. |
| 2016/0170639 A1* | 6/2016 | Velayudhan ............ G06F 3/061 711/114 |
| 2016/0276015 A1 | 9/2016 | Bains et al. |

OTHER PUBLICATIONS

Co-pending U.S. Appl. No. 15/145,099, filed May 3, 2016.
Co-pending U.S. Appl. No. 15/145,111, filed May 3, 2016.
Co-pending U.S. Appl. No. 15/145,874, filed May 4, 2016.
Co-pending U.S. Appl. No. 15/145,878, filed May 4, 2016.

* cited by examiner

SYSTEMS, DEVICES AND METHODS USING A SOLID STATE DEVICE AS A CACHING MEDIUM WITH A CACHE REPLACEMENT ALGORITHM

CROSS-REFERENCE TO RELATED APPLICATIONS

This application claims the benefit of U.S. Provisional Patent Application No. 62/158,044, filed on May 7, 2015, entitled "SYSTEMS, DEVICES AND METHODS USING A SOLID STATE DEVICE AS A CACHING MEDIUM WITH A CACHE REPLACEMENT ALGORITHM," the disclosure of which is expressly incorporated herein by reference in its entirety.

BACKGROUND

Generally caching of block device data at a relatively lower latency device provides phenomenal performance for both read and write input/output ("I/O") operations. As a read cache device, the data is stored in the cache device until it is replaced with the new data. Until then, the data is read from the cache device for subsequent read I/O operations directed to the same data block. As a write cache, the new data is written to the cache device, and the write I/O operation is informed completed. Later based on policy, the dirty data stored in the cache device is actually persisted to the underlying stable medium.

A solid state device ("SSD") can be used as the cache device. When compared to a hard disk drive, SSD devices have superior read and write performance. It is therefore desirable to maximize use of the SSD device as the cache device to achieve a greater performance advantage. In addition to having superior read and write performance, the SSD cache device typically has a larger capacity than conventional cache devices. This combination results in more complex management issues. For example, a cache medium includes a plurality of cache lines for caching data stored in the underlying data storage medium. Cache headers are provided and maintained to manage the cache lines. When servicing I/O operations, the cache headers are searched to determine whether there is a cache hit or miss. However, by maximizing use of a larger capacity cache device, more cache lines are available for caching data, and therefore more cache headers must be searched. Accordingly, the complexity of the cache header search is increased. Additionally, in case of a cache miss, it is desirable to use proper cache replacement logic to avoid swapping more-frequently accessed or more-recently accessed data out of the cache device. Swapping more-frequently accessed or more-recently accessed data out of the cache device leads to poor system performance because more and more cache misses will occur. In conventional data storage systems, least-recently used (LRU) or least-frequently used (LFU) cache replacement logic is employed to replace the old data.

SUMMARY

Systems, devices and methods for performing cache replacement for a caching medium for a data storage system are described herein. In particular, an SSD cache device is used as the caching medium for the data storage system. Cache headers for managing the cache lines of the SSD cache device are assigned to buckets of an LRU data structure, for example, using a hashing algorithm. The cache headers in each of the buckets are arranged in a linked list based on a time of access. Thus, the tail node of each respective linked list is a cache header for an LRU cache line. The tail nodes (or cache headers for the LRU cache lines) are assigned to buckets of an LFU data structure. The tail nodes in each of the buckets are arranged in a linked list based on a frequency of access. An LFU cache line is selected using the LFU data structure. Accordingly, it is possible to select an LFU cache line from among a plurality of LRU cache lines while minimizing the amount of memory needed to maintain the LRU and LFU data structures.

An example computer-implemented method for performing cache replacement for a caching medium for a data storage system can include providing an SSD cache including a plurality of cache lines, providing a least-recently used (LRU) data structure including a plurality of buckets for managing the SSD cache, and providing a plurality of cache headers for managing the cache lines. Each cache header can associate a respective cache line and a corresponding data block stored in the data storage system. The method can also include assigning two or more cache headers to a same bucket of the LRU data structure, and arranging the two or more cache headers assigned to the same bucket of the LRU data structure in a linked list based on a time of access. Because the cache headers are arranged based on the time of access, a cache header for an LRU cache line is a tail node of the linked list of the same bucket of the LRU data structure. Further, the method can include providing a least-frequently used (LFU) data structure including a plurality of frequency buckets, where each frequency bucket corresponds to a fixed frequency range, assigning the tail node of the linked list of the same bucket of the LRU data structure to one of the frequency buckets based on a frequency of access, and selecting an LFU cache line for cache replacement using the LFU data structure.

Optionally, the frequency buckets of the LFU data structure can be arranged from an LFU frequency bucket to a most-recently used (MFU) frequency bucket. Additionally, to select an LFU cache line for cache replacement, the method can include searching the frequency buckets of the LFU data structure beginning with the LFU frequency bucket to identify a frequency bucket containing the LFU cache line.

Alternatively or additionally, the method can optionally include assigning two or more tail nodes corresponding to different buckets of the LRU data structure to a same frequency bucket of the LFU data structure, and arranging the two or more tail nodes assigned to the same frequency bucket of the LFU data structure in a linked list based on the frequency of access.

Optionally, the method can include removing a cache header for the LFU cache line from the linked list of the same frequency bucket of the LFU data structure, and assigning a next LRU cache header to the linked list of the same frequency bucket of the LFU data structure.

Alternatively or additionally, the linked list of the same bucket of the LRU data structure and the linked list of the same frequency bucket of the LFU data structure are optionally doubly-linked lists, respectively. Each of the two or more tail nodes can participate in the doubly-linked list of the same frequency bucket of the LFU data structure, for example, in addition to participating in the doubly-linked lists of different buckets of the LRU data structure.

Optionally, each of the two or more tail nodes can be a respective cache header including a previous pointer and a subsequent pointer. The previous pointer can optionally be reserved to point to a next LFU cache header in the doubly-linked list of the same frequency bucket of the LFU data structure. The subsequent pointer can optionally be reserved to point to a next MFU cache header in the doubly-linked list of the same frequency bucket of the LFU data structure.

Alternatively or additionally, each of the two or more tail nodes can be a respective cache header including a previous pointer, a subsequent pointer, and a frequency counter. Each of the two or more tail nodes in the doubly-linked list of the same frequency bucket of the LFU data structure can optionally be arranged based on a value of the frequency counter.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for performing cache replacement for a caching medium for a data storage system, it will become evident to those skilled in the art that the implementations are not limited thereto.

Figure 1:
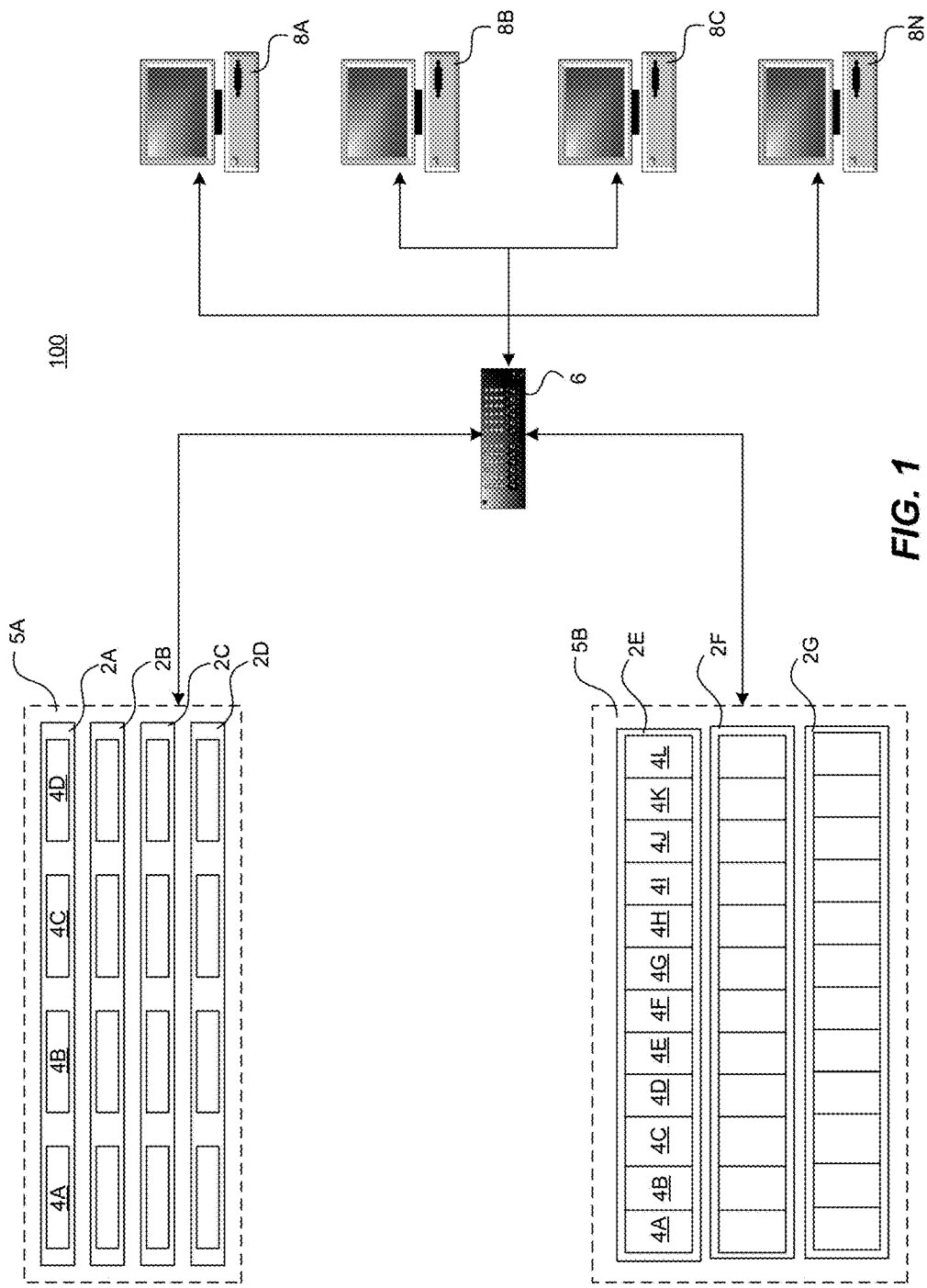
FIG. 1 is a computer architecture and network diagram showing aspects of a computer network and a storage server computer that provides an operating environment for embodiments of the disclosure presented herein.
Figure 2:
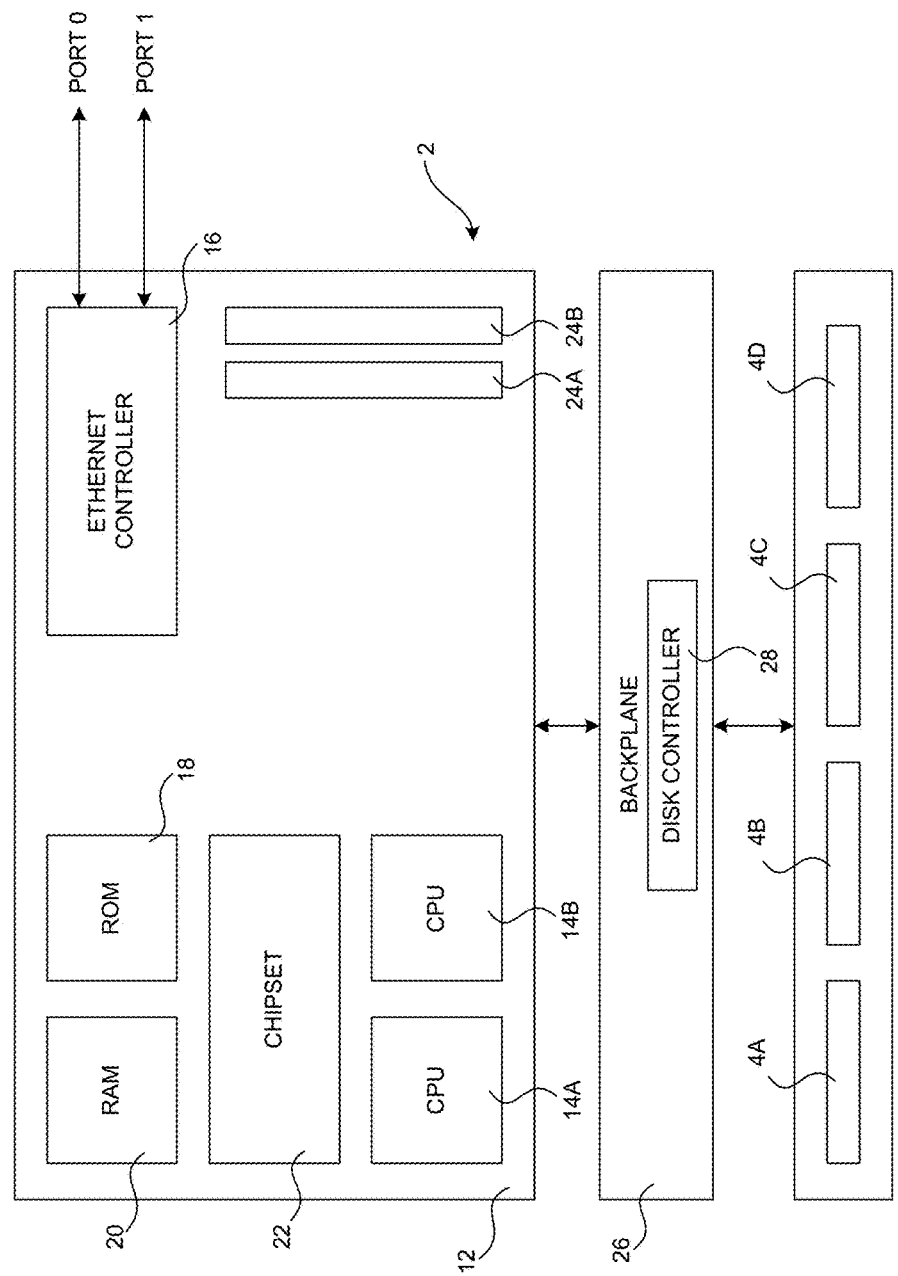
FIG. 2 is a computer architecture diagram illustrating aspects of the hardware of an illustrative storage server computer described herein.
Figure 3:
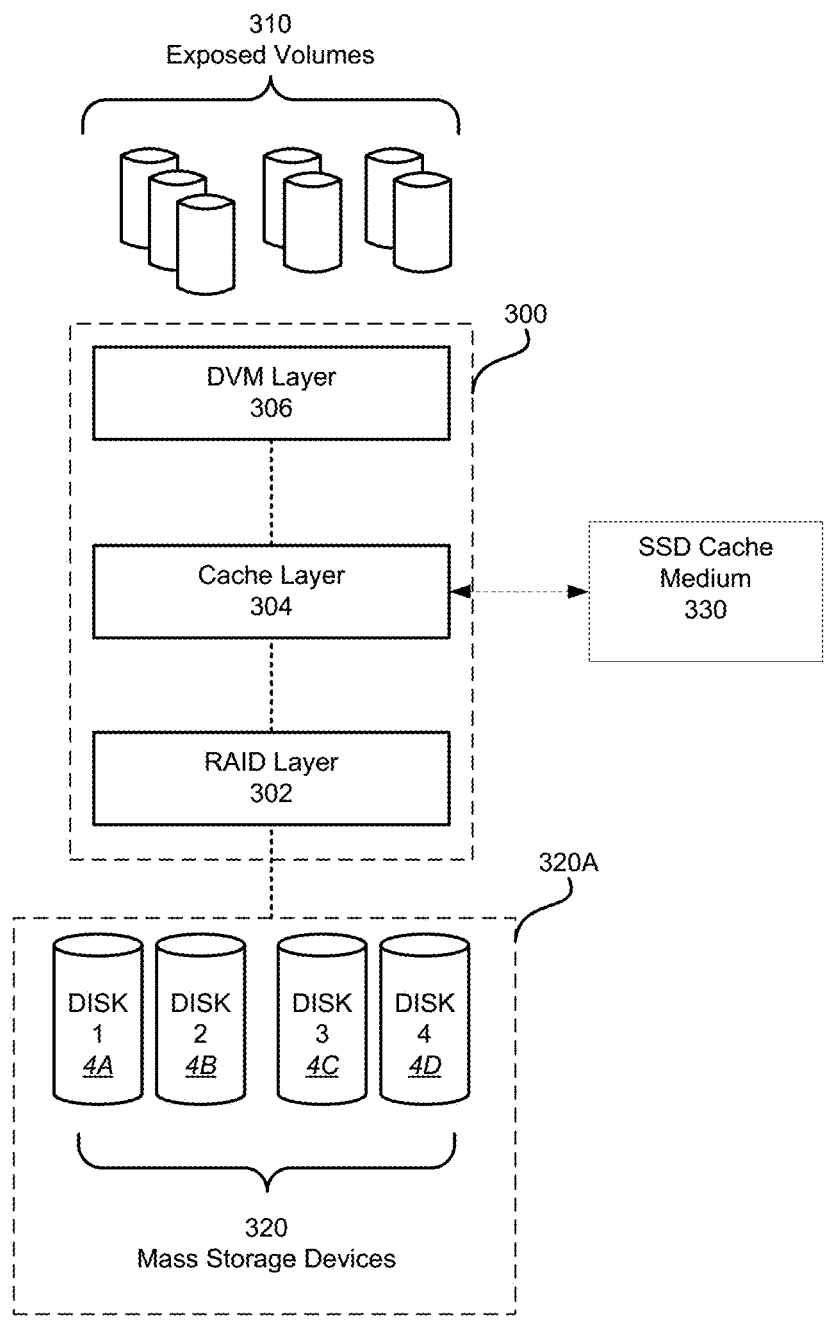
FIG. 3 is a software architecture diagram illustrating various aspects of a storage stack utilized by a storage server computer described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for using a plurality of SSDs as a caching medium for a data storage system. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Referring now to FIG. 3, an example computer software architecture for practicing the various embodiments presented herein will now be described. The computer software architecture can be implemented in a storage node 2 shown in FIGS. 1 and 2, for example. In particular, FIG. 3 illustrates a storage stack 300 used in the embodiments described herein. The storage stack 300 can include a RAID layer 302, a cache layer 304 and a distributed volume management ("DVM") layer 306. At the top of the storage stack 300, storage volumes 310 are exposed, for example, to the initiators 8A-8N shown in FIG. 1. At the bottom of the storage stack 300 are the mass storage devices 320, such as the disks 4A-4D, that are used to store the data. As discussed above, the mass storage devices are connected to a disk controller such as the disk controller 28 shown in FIG. 2. The disk controller interfaces with the mass storage devices using any standard interface such as SATA, SCSI, FC, SAS interface, etc. for physically connecting and transferring data between computers and the mass storage devices.

The RAID layer 302 abstracts the organization of the RAID array 320A and presents a logical block-level interface to higher layers in the storage stack 300. For example, the RAID layer 302 can implement RAID level 5, where data is striped across the plurality of disks (e.g., disks 4A-4D) in the RAID array 320A. In a four disk array, a RAID stripe includes data block $D_1$ stored on disk 1 (e.g., "4A"), data block $D_2$ stored on disk 2 (e.g., "4B"), data block $D_3$ stored on disk 3 (e.g., "4C") and parity block $P_A$ stored on disk 4 (e.g., "4D"), for example. The parity block $P_A$ can be computed using XOR logic of data block $D_1$, data block $D_2$ and data block $D_3$ (e.g., $P_A = D_1 \oplus D_2 \oplus D_3$). Additionally, the parity blocks in a RAID 5 array are distributed or staggered across the plurality of disks. Although RAID level 5 is discussed above, it should be understood that the RAID layer 302 can implement other RAID levels, such as RAID level 0, 1, 2, 3, 4 or 6.

The DVM layer 306 uses the block-level interface provided by the RAID layer 302 to manage the available storage capacity of the RAID array 320A and service I/O operations initiated by the initiators 8A-8N. The DVM layer 306 can implement a variety of storage management functions, such as volume virtualization, thin provisioning, snapshots, locking, data replication, etc. The DVM layer 306 can be implemented on the storage node 2 in software, hardware or a combination thereof. Volume virtualization provides the facility to create and manage multiple, logical volumes on the RAID array 320A, as well as expand a logical volume across multiple storage nodes within a storage cluster. Thin provisioning provides for the allocation of physical capacity of the RAID array 320A to logical volumes on an as-needed basis. For example, the available physical storage capacity of the RAID array 320A can be divided into a number of unique, equally-sized areas referred to as territories. Optionally, the size of a territory can be one terabyte (TB), a reduced size of 8 megabytes (MB) or any other territory size. Alternatively or additionally, the available physical storage capacity of the RAID array 320A can optionally be further subdivided into units referred to herein as provisions. The provisions can be unique, equally sized areas of the available physical capacity. For example, provisions may be 1 MB in size, a reduced size of 512 kilobytes (KB) or any other provision size. Optionally, a provision can be further subdivided into chunks. For example, the chunk size can be selected as 64 KB, a reduced size of 8 KB or any other chunk size. Snapshots provide functionality for creating and utilizing point-in-time snapshots of the contents of logical storage volumes. The locking functionality allows for synchronizing I/O operations within the storage node 2 or across nodes within the storage cluster. Data replication provides functionality for replication of data within the storage node 2 or across nodes within the storage cluster 2.

The cache layer 304 intercepts read and/or write I/O operations flowing between the RAID layer 302 and the DVM layer 306. The cache layer 304 is configured to read data from and/or write data to an SSD cache medium 330. The cache layer 304 can be implemented on the storage node 2 in software, hardware or a combination thereof. The SSD cache medium 330 can be used in either a write-through cache mode or a write-back cache mode. When the SSD cache medium 330 is controlled according to the write-through cache mode, a new read I/O operation (e.g., directed to a data block) is stored in the SSD cache medium 330 before returning the requested data block to the host (e.g., initiators 8A-8N of FIG. 1). Alternatively, the new read I/O operation can be performed in parallel, which decreases the response time to host. For example, once the requested data is retrieved from the mass storage devices 320, the retrieved data is stored in SSD cache medium 330 in parallel to returning the requested data block to the host. A subsequent read I/O operation requesting the read data block is retrieved from the SSD cache medium 330 instead of the mass storage devices 320. When the SSD cache medium 330 is controlled according to a write-back cache mode, a new write I/O operation (e.g., directed to a data block) is performed in the SSD cache medium 330. Then, the host (e.g., initiators 8A-8N of FIG. 1) is informed that the new write I/O operation is complete. At a later time, the data block (e.g., a dirty data block) is flushed or persisted to the mass storage devices 320 (e.g., the underlying stable medium). It should be understood that in either mode caching pairs the lower-latency SSD cache medium 330 with the mass storage devices 320. Additionally, the cache layer 304 can be configured to perform the operations for performing cache replacement in the SSD cache medium 330 as described in further detail below.

As described above, it is desirable to maximize the use of the available storage capacity of the SSD cache medium 330 due to its superior I/O performance capability as compared to that of the mass storage devices 320. An example technique to maximize use of the SSD cache medium 330 is to accommodate both smaller, random I/O operations as well as larger, sequential I/O operations. For example, instead of using 64 KB cache line granularity similar to conventional SSD cache applications, a smaller SSD cache line granularity such as 8 KB, for example, can optionally be used with the techniques described herein to maximize use of the SSD cache medium 330. When using 64 KB cache line granularity, a 64 KB cache line is underutilized when less than 64 KB of data (e.g., only a 8 KB of data from a random I/O) is stored in the cache line. In other words, a portion of the storage capacity of the 64 KB cache line remains unused when only 8 KB of data is stored therein. On the other hand, when using 8 KB cache line granularity, use of the available storage capacity of the SSD cache medium 330 is maximized because less storage space is underutilized. For example, the SSD cache device with 8 KB cache line granularity can accommodate smaller, random I/O operations (e.g., 8 KB of data) in a single cache line, as well as larger, sequential I/O operations (e.g., 32 KB of data) in multiple cache lines. It should be understood that 8 KB cache line granularity is provided herein only as an example of smaller SSD cache line granularity and that SSD cache line granularity more or less than 8 KB (e.g., 4 KB, 16 KB, 32 KB, etc.) can be used with to the techniques described herein.

The smaller SSD cache line granularity facilitates caching more data and also maximizing use of the storage capacity of the SSD cache medium 330 for caching the underlying slow storage. However, the amount of hash search required to find a cache hit increases due to the larger number of cache headers, and the searching becomes more complex, which puts additional pressure on the data storage system computer performing the hash search. Grouping cache headers into hash buckets and then sorting the cache headers based on time of access (e.g., the MRU cache forms the head of the list within the hash bucket and the LRU cache header forms the tail of the list within the hash bucket) can ensure faster and less complex searching. In case of a cache miss, it is desirable to use proper cache replacement logic to avoid swapping more-frequently accessed or more-recently accessed data out of the cache device. As described above, swapping more-frequently accessed or more-recently accessed data out of the cache device leads to poor system performance because more and more cache misses will occur.

Referring now to FIGS. 4A-4D, block diagrams illustrating an example data structure 402 for managing an SSD cache (e.g., the SSD cache medium 330 of FIG. 3) are shown. The data structure 402 can be a list having a plurality of entries or buckets 404. For example, the data structure 402 can be a hash bucket list. A cache header such as cache headers 406A and 406N (hereinafter collectively referred to as cache headers 406), for example, can be provided for each cache line in order to manage the cache lines of the SSD cache. A cache header can be used to associate a cache line (e.g., the data stored in the cache line) with a corresponding data block stored in the underlying storage medium (e.g., the mass storage devices of FIG. 3). For example, a cache header can include an index to (or storage address of) a cache line in the SSD cache and a tag to (or storage address of) the corresponding data block stored in the underlying storage medium. As described further below, when an I/O operation is received, the cache headers 406 can be searched to determine whether the I/O operation is a cache hit or a cache miss. Optionally, a cache header can include one or more pointers such as previous pointer and/or subsequent pointers to other cache headers, for example. Alternatively or additionally, a cache header can optionally include a counter for tracking a time of last access and/or a frequency of access of the cache line. As shown in FIGS. 4A-4D, the cache headers 406 are assigned to the buckets 404 of the data structure 402. The cache headers 406 can be linked to other cache headers and the buckets 404 with pointers (e.g., double and single pointers 410 and 420). This disclosure contemplates that cache headers can contain more or less information or fields for managing the cache lines of the SSD cache than as described above, including any information provided in cache headers as known in the art.

A hashing algorithm can be used to assign cache headers 406 to particular buckets 404 of the data structure 402. For example, a cache header can be assigned to a particular bucket of the data structure based on the location of the data block in the underlying storage medium (e.g., a contiguous region of the physical storage capacity of the underlying storage medium where the data block is stored). In other words, the hashing algorithm can return the same hash value for data blocks stored in the same contiguous region of the physical storage capacity of the underlying storage medium. Each contiguous region of the physical storage capacity can have a predetermined size such as 64 KB, for example. It should be understood that 64 KB is provided only as an example of the size of each contiguous region and that the size of each contiguous region can be more or less than 64 KB. Using the hashing algorithm, cache headers for cache lines storing data blocks stored within the same contiguous region of the physical storage capacity can therefore be assigned to the same bucket of the data structure 402.

The data structure 402 shown in FIGS. 4A-4D optionally includes one million buckets 404 and supports fifty-six million cache headers 406. In other words, each bucket 404 of the data structure 402 can include fifty six cache headers 406. This disclosure contemplates that the data structure 402 can include more or less buckets and/or can support more or less cache headers than as described with regard to FIGS. 4A-4D, which is provided only as an example. In the data structure 402, cache headers for cache lines storing data blocks corresponding to the first 64 KB contiguous region of the physical storage capacity of the underlying storage medium can be assigned to a first bucket. Cache headers for cache lines storing data blocks corresponding to the second 64 KB contiguous region of the physical storage capacity can be assigned to a second bucket. Cache headers for cache lines storing data blocks corresponding to the third 64 KB contiguous region of the physical storage capacity can be assigned to a third bucket. Cache headers for cache lines storing data blocks corresponding to a subsequent 64 KB contiguous region of the physical storage capacity can be assigned to a subsequent bucket until the final bucket (e.g., the one-millionth bucket) is reached. Thereafter, cache headers for cache lines storing data blocks corresponding to a subsequent 64 KB contiguous region of the physical storage capacity can be assigned to the first bucket.

The cache headers 406 assigned to each of the buckets 404 of the data structure 402 can be arranged based on a time of access. In other words, the cache headers 406 assigned to a particular bucket of the data structure 402 can be sorted within the particular bucket based on the time of access. As described above, the time of access (e.g., a time of last access) can be tracked using a counter in the cache headers 406, for example. The cache headers 406 can be maintained in the particular bucket of the data structure 402 in a linked list. Optionally, as described in detail below, the cache headers 406 can be maintained in the particular bucket of the data structure 402 in a doubly-linked list. The cache headers 406 can be arranged from a most-recently used (MRU) cache header 406A at a head of the linked list to a LRU cache header 406N at a tail of the linked list. In FIGS. 4A-4D, the plurality of cache headers 406 in each of the buckets 404 of the data structure 402 can be sorted from a MRU cache header to an LRU cache header. Accordingly, an LRU cache header can be a tail node of the linked list of each of the buckets 404 of the data structure 402. It should be understood that the MRU cache header 406A is the cache header for the cache line associated with the MRU data block stored in the underlying storage medium, and the LRU cache header 406N is the cache header for the cache line associated with the LRU data block stored in the underlying storage medium. The data structure 402 with buckets 404 having cache lines 406 arranged based on a time of access is referred herein as a "LRU data structure."

An LFU data structure 430 can be maintained in addition to the data structure 402 (i.e., the LRU data structure). The LFU data structure 430 can be a list having a plurality of entries or buckets 432. For example, the LFU data structure 430 can be a frequency bucket list. Each frequency bucket 432 in the LFU data structure 430 can correspond to a fixed frequency range. For example, frequency bucket "0" can correspond to a frequency range 0-127, frequency bucket "1" can correspond to a frequency range 128-1K, frequency bucket "2" can correspond to a frequency range 1K-4K, frequency bucket "3" can correspond to a frequency range 4K-16K, etc. It should be understood that the number of frequency buckets 432 in the LFU data structure 430, as well as the fixed frequency ranges for each of the frequency buckets, can have values other than those described with regard to FIGS. 4A-4D, which are provided as examples only. Optionally, the frequency buckets 432 of the LFU data structure 430 can be sorted from an LFU frequency bucket to a MFU frequency bucket. For example, the frequency bucket corresponding to a predetermined frequency range 0-127 can be arranged at the top of the LFU data structure 430, and the frequency bucket corresponding to a maximum fixed frequency range can be arranged at the bottom of the LFU data structure 430.

Figure 4A:
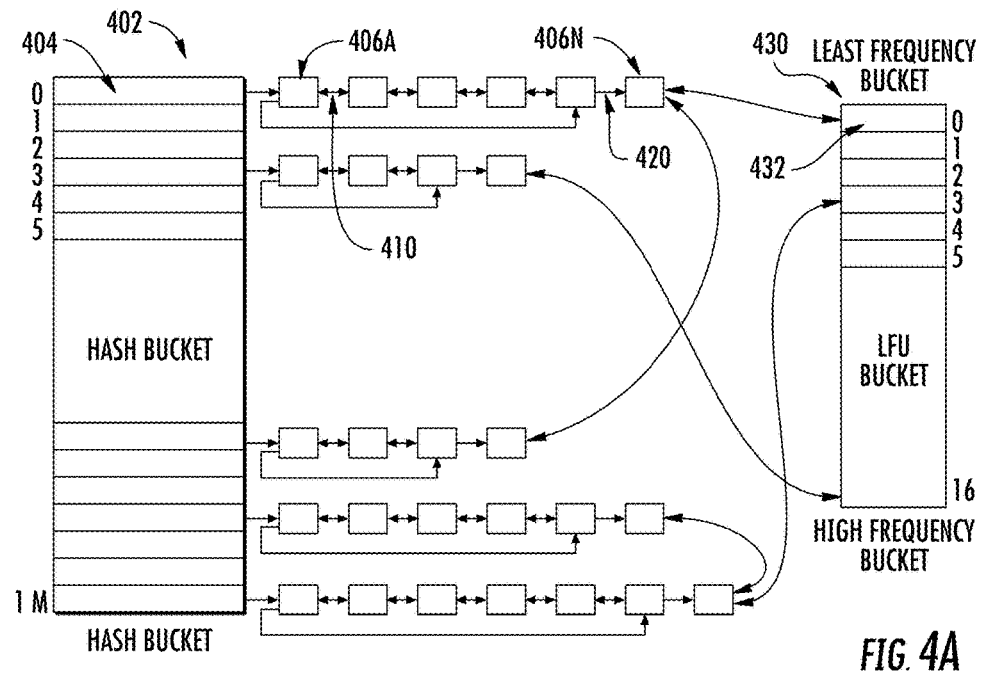
FIG. 4A is a block diagram illustrating an example data structure for managing an SSD cache as described herein.
Figure 4B:
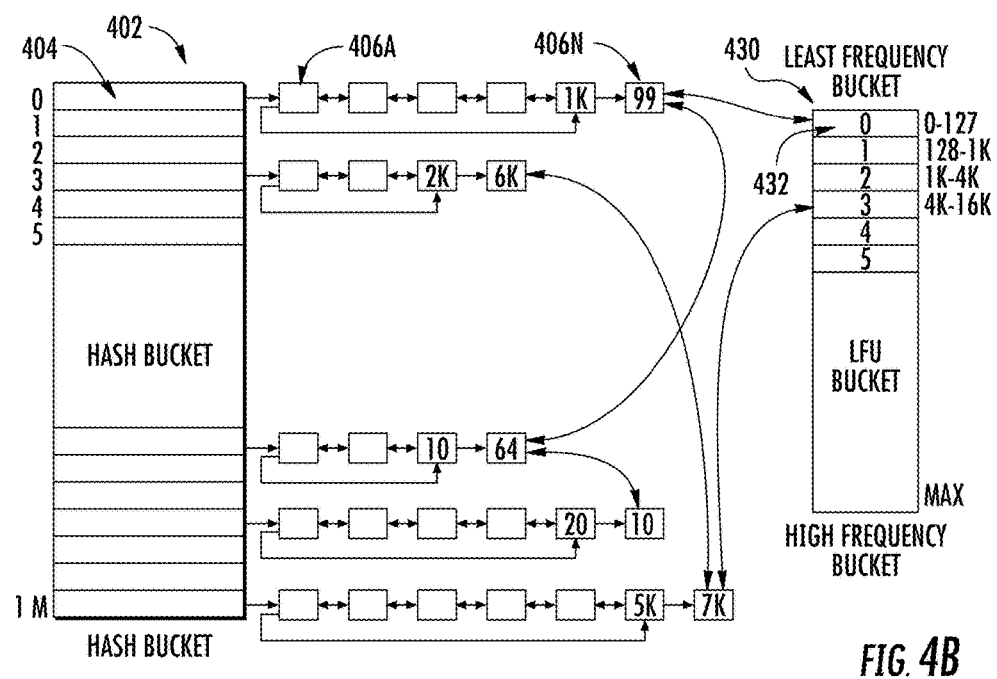
FIG. 4B is another block diagram illustrating the example data structure for managing an SSD cache as described herein.
Figure 4C:
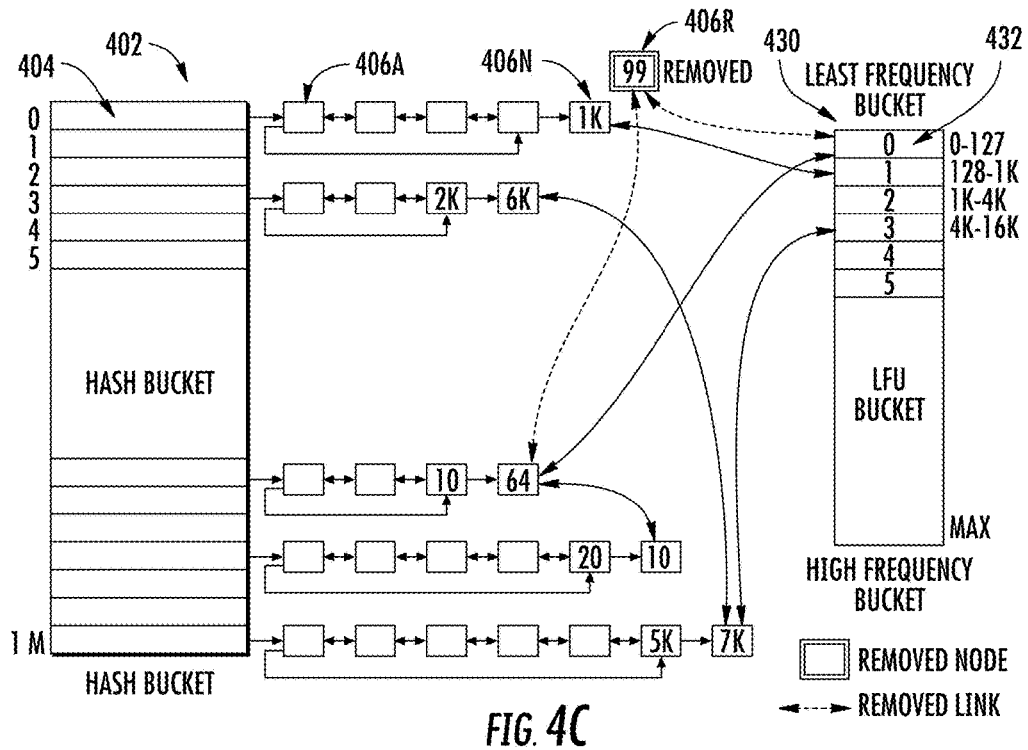
FIG. 4C is another block diagram illustrating the example data structure for managing an SSD cache as described herein.
Figure 4D:
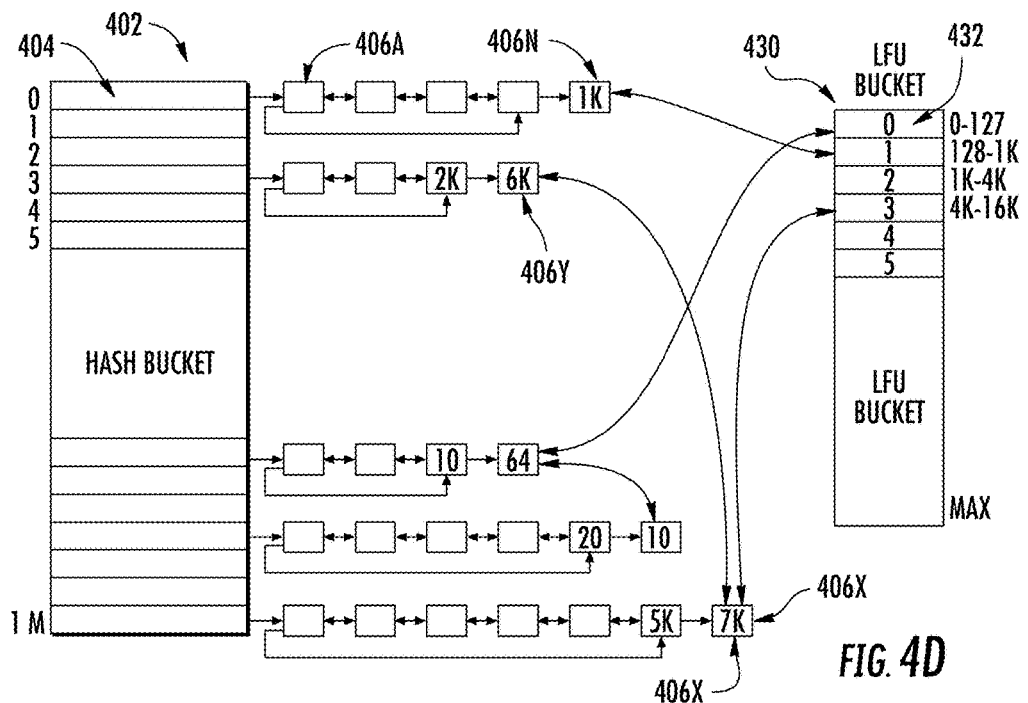
FIG. 4D is another block diagram illustrating the example data structure for managing an SSD cache as described herein.

A tail node (e.g., an LRU cache header) of a linked list of each of the buckets 404 of the data structure 402 can be assigned to a frequency bucket of the LFU data structure 430. For example, each LRU cache header of a linked list of each of the buckets 404 of the data structure 402 can be assigned to a frequency bucket of the LFU data structure 430 based on a frequency of access. As described above, each cache header can include a counter for tracking a frequency of access (e.g., a frequency counter). For example, a frequency counter of a cache header can be incremented each time a cache line associated with the cache header is accessed. Optionally, the frequency counter can be reset, for example to zero, after a fixed period of time. It should be understood that the fixed period of time can be any period of time such as seconds, minutes, hours, days, etc., for example. Accordingly, each LRU cache header of a linked list of each of the buckets 404 of the data structure 402 can be assigned to a frequency bucket of the LFU data structure 430 based on a value of its respective frequency counter. For example, as shown in FIG. 4B, an LRU cache header having a frequency counter with a value of 99 (e.g., cache header 406N) can be assigned to frequency bucket "0," which corresponds to a frequency range 0-127. Optionally, the LRU cache headers assigned to the same frequency bucket of the LFU data structure 430 can be arranged based on the frequency of access, for example, from a MFU cache header to a LFU cache header. For example, as shown in FIG. 4D, cache headers 406X and 406Y, which are both tail nodes of respective linked lists of buckets of the data structure 402, are assigned to frequency bucket "3" based on the frequency of access being in the fixed frequency range for frequency bucket "3" (e.g., 4K-16K). The MFU cache header 406X is arranged at a head of the linked list of frequency bucket "3" (i.e., cache header 406X is the head node), and the LFU cache header 406Y is arranged at a tail of the linked list of frequency bucket "3" (i.e., cache header 406Y is the tail node). Accordingly, in FIG. 4D, cache headers 406X and 406Y are arranged based on their respective frequencies of access (e.g., 7 k and 6 k). Alternatively, cache headers 406X and 406Y can be arranged from a LFU cache header to a MFU cache header, i.e., with the LFU cache header being the head node and the MFU cache header being the tail node. Alternatively, the cache headers assigned to the same frequency bucket of the LFU data structure 430 do not need to be arranged or sorted in any particular order based on their respective frequencies of access. In this scenario, LRU cache headers (or tail nodes of the data structure 402 of FIGS. 4A-4D) are inserted at the respective head nodes of the frequency buckets in the LFU data structure 430 (and the list is not subsequently re-ordered based on any metric).

Using the LFU data structure 430, and in response to cache pressure, LFU cache headers can be selected for cache replacement before MFU cache headers are selected. In particular, the cache header at the head node of the frequency bucket associated with the lowest range (e.g., bucket "0" in FIG. 4C) can be selected for replacement. For example, the frequency buckets 432 of the LFU data structure 430 can be searched, and optionally in sequential order, to identify the LFU cache header. The search can begin with the LFU frequency bucket (e.g., frequency bucket "0"). If there are no cache headers (e.g., LRU cache headers or tail nodes) assigned to the LFU frequency bucket, the search continues to the next subsequent frequency bucket until the LFU cache header is identified. As shown in FIG. 4C, cache header 406R, which is the head node of the frequency bucket associated with the lowest frequency range in the LFU data structure 430, is selected for cache replacement. After selecting cache header 406R for cache replacement, cache header 406R is removed from the linked list of frequency bucket "0." When the linked list of frequency bucket "0" is a doubly-linked list, cache header 406R can be efficiently removed from the doubly-linked list by modifying the pointers of the nodes directly before and after cache header 406R. In other words, cache header 406R is bypassed in the doubly-linked list without traversing the doubly-linked list. Additionally, after removing cache header 406R, the next LRU cache header of the linked list of the bucket of the data structure 402 (e.g., cache header 406N in FIG. 4C) is assigned to the LFU data structure 430. As described above, the next LRU cache header is assigned to a frequency bucket of the LFU data structure 430 based on the frequency of access. In FIG. 4C, cache header 406N is assigned to frequency bucket "1" based on the frequency counter of 1 k. Optionally, the LFU cache header (e.g., the LFU cache header among all LRU cache headers or tail nodes), and therefore the LFU cache line, can be selected for cache replacement using the LFU data structure 430. As described above, in the event that more than one cache header is assigned to a frequency bucket of the LFU data structure 430, the linked list of the frequency bucket of the LFU data structure 430 can be arranged from a LFU cache header to a MFU cache header, i.e., with the LFU cache header being the head node and the MFU cache header being the tail node. Alternatively, the linked list of the frequency bucket of the LFU data structure 430 can be arranged from a MFU cache header to a LFU cache header, i.e., with the MFU cache header being the head node and the LFU cache header being the tail node, and the linked list can be traversed to identify the LFU cache header (e.g., the tail node of the linked list). In either example, the LFU cache header can be selected for cache replacement and then removed from the LFU data structure 430.

Figure 4E:
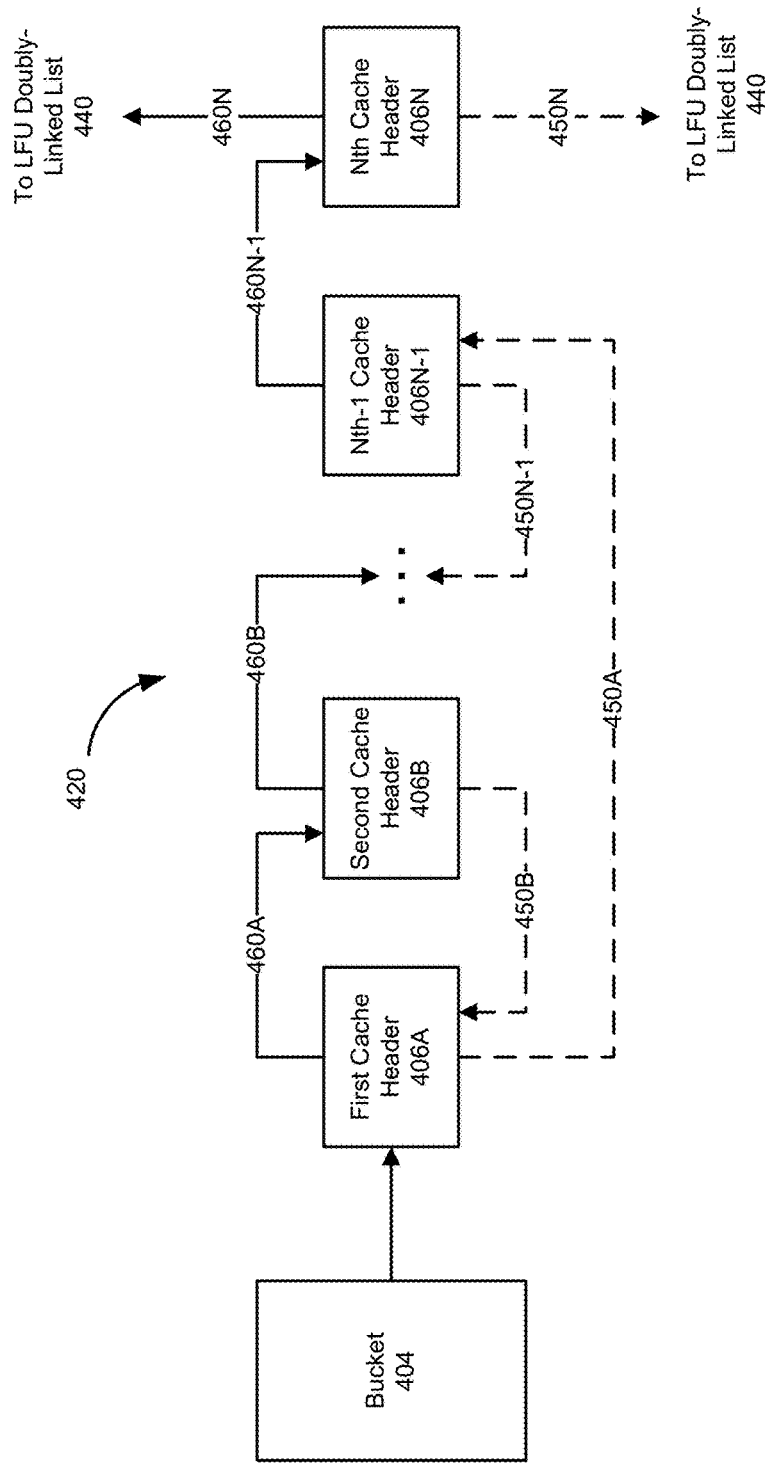
FIG. 4E is a block diagram of an overloaded doubly-linked list as described herein.

As described above, each linked list of the respective buckets 404 of the data structure 402 and each linked list of the respective frequency buckets 432 of the LFU data structure 430 can be doubly-linked lists. A doubly-linked list facilitates traversal of the linked list in either forward or backward directions. Additionally, a doubly-linked list allows for more efficient addition and/or removal of nodes from the linked list. The doubly-linked list can optionally be an overloaded doubly-linked list to reduce the amount of memory used to maintain the doubly-linked list. An overloaded doubly-linked list is described below with regard to FIG. 4E. The cache headers 406A-406N of a doubly-linked list 420 of a bucket 404 of the LRU data structure have previous pointers 450A-450N and subsequent pointers 460A-460N. A previous pointer points from a node to an immediately previous node. For example, in FIG. 4E, previous pointer 450B points from second cache header 406B to first cache header 406A. A subsequent pointer points from a node to an immediately subsequent node. For example, in FIG. 4E, subsequent pointer 460A points from first cache header 406A to second cache header 406B. A previous pointer 450A of first cache header 406A (e.g., a first node) of the doubly-linked list 420 can point to the second-to-last node (e.g., Nth−1 cache header 406N−1). The first node can be identified by a specific bit of the cache header. If the specific bit for a first node is set, the previous pointer (e.g., previous pointer 450A) is made to point to the second-to-last (e.g., Nth−1 cache header 406N−1). The first node does not need its previous pointer because it is the first node after a head node of the doubly-linked list 420 (e.g., bucket 404). First cache header 406A can be reached from bucket 404 with just one link traverse.

Additionally, Nth−1 cache header 406N−1 (e.g., the second-to-last node) can be reached from first cache header 406A with just one link traverse. A subsequent pointer 460N−1 of Nth−1 cache header 406N−1 can point to Nth cache header 406N, which is a tail node of the doubly-linked list 440. As described above, a tail node of the linked list of the LRU data structure is the LRU cache header, and the LRU cache header is assigned to the LFU data structure. The tail node can be identified by a specific bit of the cache header. If the specific bit for a tail node is set, the previous and subsequent pointers (e.g., previous and subsequent pointers 450N and 460N) can be reserved to point to previous and subsequent nodes, respectively, in a doubly-linked list 440 of a frequency bucket of the LFU data structure. The previous pointer 450A of Nth cache header 406N does not need to be used in the doubly-linked list 420 of the bucket 404 of the LRU data structure. Additionally, the subsequent pointer 460N of Nth cache header 406N does not need to be used in the doubly-linked list 420 of the bucket 404 of the LRU data structure because it is not a circular list. Accordingly, previous pointer 450A and subsequent pointer 460N of Nth cache header 406N can be reserved to participate in the doubly-linked list 440 of a frequency bucket of the LFU data structure. It is therefore possible to reduce the amount of memory needed to maintain the LFU data structure.

Figure 5:
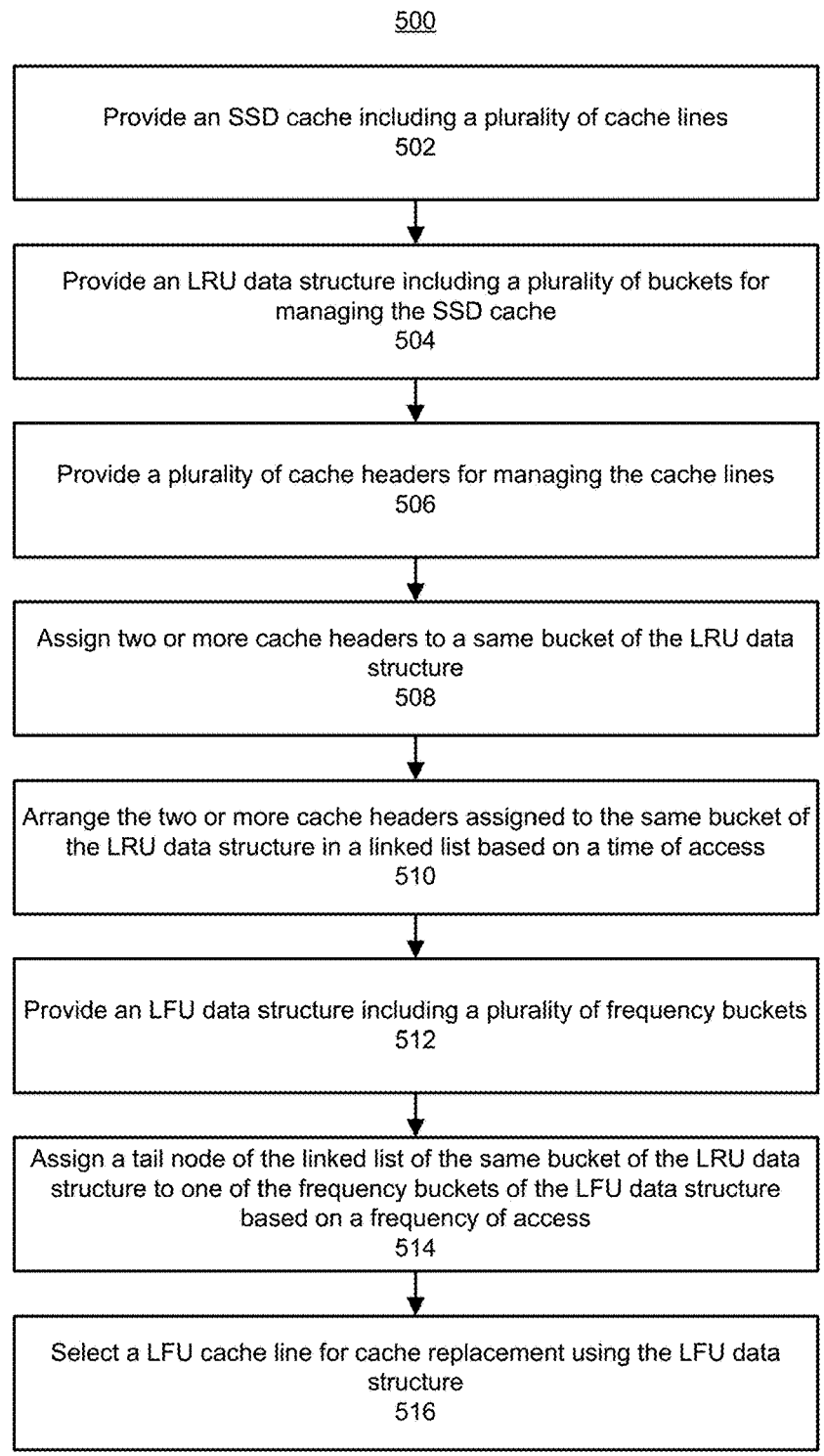
FIG. 5 is a flow diagram illustrating example operations for performing cache replacement in a caching medium for a data storage system as described herein.

Referring now to FIG. 5, a flow diagram illustrating example operations for performing cache replacement in a caching medium for a data storage system are shown. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram illustrating example operations 500 for performing cache replacement in a caching medium for a data storage system. At 502, an SSD cache including a plurality of cache lines is provided. At 504, an LRU data structure including a plurality of buckets for managing the SSD cache is provided. An example LRU data structure is described in detail above with regard to FIGS. 4A-4D. At 506, a plurality of cache headers for managing the cache lines are provided. As described in detail above, each cache header associates a respective cache line and a corresponding data block stored in the data storage system. At 508, two or more cache headers are assigned to a same bucket of the LRU data structure. At 510, the two or more cache headers assigned to the same bucket of the LRU data structure are arranged in a linked list based on a time of access. Because the cache headers are arranged in the linked list based on the time of access, a cache header for an LRU cache line is a tail node of the linked list of the same bucket of the LRU data structure. At 512, an LFU data structure including a plurality of frequency buckets is provided. Each frequency bucket corresponds to a fixed frequency range. An example LRU data structure is described in detail above with regard to FIGS. 4A-4D. At 514, the tail node of the linked list of the same bucket of the LRU data structure is assigned to one of the frequency buckets of the LFU data structure based on a frequency of access. Then, at 516, an LFU cache line is selected for cache replacement using the LFU data structure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for performing cache replacement in a caching medium for a data storage system, comprising:
   providing an SSD cache including a plurality of cache lines;
   providing a least-recently used (LRU) data structure including a plurality of buckets for managing the SSD cache;
   providing a plurality of cache headers for managing the cache lines, each cache header associating a cache line and a corresponding data block stored in the data storage system;
   assigning two or more cache headers to a same bucket of the LRU data structure;
   arranging the two or more cache headers assigned to the same bucket of the LRU data structure in a linked list based on a time of access, wherein a cache header for an LRU cache line is a tail node of the linked list of the same bucket of the LRU data structure;
   providing a least-frequently used (LFU) data structure including a plurality of frequency buckets, each frequency bucket corresponding to a fixed frequency range;
   assigning the tail node of the linked list of the same bucket of the LRU data structure to one of the frequency buckets of the LFU data structure based on a frequency of access; and
   selecting an LFU cache line for cache replacement using the LFU data structure.

2. The computer-implemented method of claim 1, wherein the frequency buckets of the LFU data structure are arranged from an LFU frequency bucket to a most-recently used (MFU) frequency bucket.

3. The computer-implemented method of claim 2, wherein selecting an LFU cache line for cache replacement using the LFU data structure further comprises searching the frequency buckets of the LFU data structure beginning with the LFU frequency bucket to identify a frequency bucket containing the LFU cache line.

4. The computer-implemented method of claim 1, further comprising:
   assigning two or more tail nodes corresponding to different buckets of the LRU data structure to a same frequency bucket of the LFU data structure; and
   arranging the two or more tail nodes assigned to the same frequency bucket of the LFU data structure in a linked list based on the frequency of access.

5. The computer-implemented method of claim 1, further comprising:
   removing a cache header for the LFU cache line from the linked list of the same frequency bucket of the LFU data structure; and
   assigning a next LRU cache header to the linked list of the same frequency bucket of the LFU data structure.

6. The computer-implemented method of claim 4, wherein the linked list of the same bucket of the LRU data structure and the linked list of the same frequency bucket of the LFU data structure are doubly-linked lists.

7. The computer-implemented method of claim 6, wherein each of the two or more tail nodes participate in the doubly-linked list of the same frequency bucket of the LFU data structure.

8. The computer-implemented method of claim 7, wherein each of the two or more tail nodes is a respective cache header comprising a previous pointer and a subsequent pointer, the previous pointer being reserved to point to a next LFU cache header in the doubly-linked list of the same frequency bucket of the LFU data structure, and the subsequent pointer being reserved to point to a next MFU cache header in the doubly-linked list of the same frequency bucket of the LFU data structure.

9. The computer-implemented method of claim 8, wherein each of the two or more tail nodes is a respective cache header further comprising a frequency counter, and each of the two or more tail nodes is arranged in the doubly-linked list of the same frequency bucket of the LFU data structure based on a value of the frequency counter.

10. A non-transitory computer-readable recording medium having computer-executable instructions stored thereon for performing cache replacement in a caching medium for a data storage system that, when executed by a data storage system computer, cause the data storage system computer to:
    provide an SSD cache including a plurality of cache lines;
    provide a least-recently used (LRU) data structure including a plurality of buckets for managing the SSD cache;
    provide a plurality of cache headers for managing the cache lines, each cache header associating a cache line and a corresponding data block stored in the data storage system;
    assign two or more cache headers to a same bucket of the LRU data structure;
    arrange the two or more cache headers assigned to the same bucket of the LRU data structure in a linked list based on a time of access, wherein a cache header for an LRU cache line is a tail node of the linked list of the same bucket of the LRU data structure;
    provide a least-frequently used (LFU) data structure including a plurality of frequency buckets, each frequency bucket corresponding to a fixed frequency range;
    assign the tail node of the linked list of the same bucket of the LRU data structure to one of the frequency buckets of the LFU data structure based on a frequency of access; and
    select an LFU cache line for cache replacement using the LFU data structure.

11. The non-transitory computer-readable recording medium of claim 10, wherein the frequency buckets of the LFU data structure are arranged from an LFU frequency bucket to a most-recently used (MFU) frequency bucket.

12. The non-transitory computer-readable recording medium of claim 11, wherein selecting an LFU cache line for cache replacement using the LFU data structure further comprises searching the frequency buckets of the LFU data structure beginning with the LFU frequency bucket to identify a frequency bucket containing the LFU cache line.

13. The non-transitory computer-readable recording medium of claim 10, having further computer-executable instructions stored thereon that, when executed by the data storage system computer, cause the data storage system computer to:
assign two or more tail nodes corresponding to different buckets of the LRU data structure to a same frequency bucket of the LFU data structure; and
arrange the two or more tail nodes assigned to the same frequency bucket of the LFU data structure in a linked list based on the frequency of access.

14. The non-transitory computer-readable recording medium of claim 10, having further computer-executable instructions stored thereon that, when executed by the data storage system computer, cause the data storage system computer to:
remove a cache header for the LFU cache line from the linked list of the same frequency bucket of the LFU data structure; and
assign a next LRU cache header to the linked list of the same frequency bucket of the LFU data structure.

15. The non-transitory computer-readable recording medium of claim 13, wherein the linked list of the same bucket of the LRU data structure and the linked list of the same frequency bucket of the LFU data structure are doubly-linked lists.

16. The non-transitory computer-readable recording medium of claim 15, wherein each of the two or more tail nodes participate in the doubly-linked list of the same frequency bucket of the LFU data structure.

17. The non-transitory computer-readable recording medium of claim 16, wherein each of the two or more tail nodes is a respective cache header comprising a previous pointer and a subsequent pointer, the previous pointer being reserved to point to a next LFU cache header in the doubly-linked list of the same frequency bucket of the LFU data structure, and the subsequent pointer being reserved to point to a next MFU cache header in the doubly-linked list of the same frequency bucket of the LFU data structure.

18. A data storage system, comprising:
a plurality of disks providing a physical storage capacity of the data storage system;
an SSD cache providing a caching medium for the data storage system, the SSD cache including a plurality of cache lines;
a data storage system computer comprising a processor and a memory in communication with the processor, the memory having computer-executable instructions stored thereon that, when executed by the processor, cause the data storage system computer to:
provide a least-recently used (LRU) data structure including a plurality of buckets for managing the SSD cache;
provide a plurality of cache headers for managing the cache lines, each cache header associating a cache line and a corresponding data block stored in the data storage system;
assign two or more cache headers to a same bucket of the LRU data structure;
arrange the two or more cache headers assigned to the same bucket of the LRU data structure in a linked list based on a time of access, wherein a cache header for an LRU cache line is a tail node of the linked list of the same bucket of the LRU data structure;
provide a least-frequently used (LFU) data structure including a plurality of frequency buckets, each frequency bucket corresponding to a fixed frequency range;
assign the tail node of the linked list of the same bucket of the LRU data structure to one of the frequency buckets of the LFU data structure based on a frequency of access; and
select an LFU cache line for cache replacement using the LFU data structure.

19. The data storage system of claim 18, wherein the frequency buckets of the LFU data structure are arranged from an LFU frequency bucket to a most-recently used (MFU) frequency bucket.

20. The data storage system of claim 19, wherein selecting an LFU cache line for cache replacement using the LFU data structure further comprises searching the frequency buckets of the LFU data structure beginning with the LFU frequency bucket to identify a frequency bucket containing the LFU cache line.

* * * * *